United States Patent [19]

Takaragi et al.

[11] Patent Number: 4,885,777
[45] Date of Patent: Dec. 5, 1989

[54] ELECTRONIC TRANSACTION SYSTEM

[75] Inventors: Kazuo Takaragi, Yokohama; Ryoichi Sasaki, Fujisawa; Takayoshi Shiraishi, Chigasaki; Nobuhiro Kurashiki, Yokohama, all of Japan

[73] Assignee: Hitachi, Ltd., Tokyo, Japan

[21] Appl. No.: 180,050

[22] Filed: Apr. 11, 1988

Related U.S. Application Data

[63] Continuation of Ser. No. 897,861, Aug. 19, 1986, abandoned.

[30] Foreign Application Priority Data

Sep. 4, 1985 [JP] Japan .................................. 60-193735
Apr. 28, 1986 [JP] Japan .................................. 61-96705

[51] Int. Cl.$^4$ ............................................. H04K 1/00
[52] U.S. Cl. ....................................... 380/30; 380/23; 380/25; 380/49
[58] Field of Search ..................... 380/18, 49, 50, 51, 380/55; 364/200, 900

[56] References Cited

U.S. PATENT DOCUMENTS

| | | | |
|---|---|---|---|
| 3,938,091 | 2/1976 | Atalla et al. | 178/22.08 |
| 4,264,782 | 4/1981 | Konheim | 380/25 |
| 4,386,233 | 5/1983 | Smid et al. | 380/25 |
| 4,393,269 | 7/1983 | Konheim et al. | 380/25 |
| 4,458,109 | 7/1984 | Mueller-Schloer | 178/22.11 |
| 4,467,139 | 8/1984 | Mollier | 380/23 |
| 4,567,600 | 1/1986 | Massey et al. | 178/22.11 |
| 4,578,531 | 3/1986 | Everhart et al. | 178/22.11 |
| 4,625,076 | 11/1986 | Okamoto et al. | 380/23 |
| 4,771,461 | 9/1988 | Matyas | 380/24 |

FOREIGN PATENT DOCUMENTS 0089087 9/1983 European Pat. Off. .

OTHER PUBLICATIONS

*IBM Tech. Discl. Bull.;* (vol. 20, No. 12; 5/78; pp. 5245-5247.
Chaum et al, *Advances in Cryptology: Proceedings of Crypto '82;* (Plenum Press, N.Y., 1982; pp. 187-197).

Primary Examiner—Stephen C. Buczinski
Assistant Examiner—Bernarr Earl Gregory
Attorney, Agent, or Firm—Antonelli, Terry & Wands

[57] ABSTRACT

An electronic transaction in which in order to improve a reliability of message certification by digital signature and enable the use of the digital signature in a formal transaction in place of conventional signature or seal, the following procedures are implemented utilizing the fact that, in a public key cryptograph system represented by an RSA system, a first encoded message derived by encoding a first decoded message by using a public key of a first transacting party is equal to a second encoded message derived by encoding a second decoded message by using a public key of a second transacting party: (a) Check sender/receiver; (b) Add content certification function; (c) Double check the person by the possession of a secret key and the response by a terminal; (d) Add a grace period to the electronic seal; and (e) Send back a tally impression from the receiver to the sender.

4 Claims, 8 Drawing Sheets

ELECTRONIC TRANSACTION SYSTEM

This application is a continuation Ser. No. 897,861, filed Aug. 19, 1986, now abandoned.

BACKGROUND OF THE INVENTION

The present invention relates to an electronic transaction system which electronically effects commercial transactions by computer documents instead of conventional documents.

In the past, contracts have been authenticated or validated by signatures or seals. Where data is transmitted through a communication like electronic transaction between two parties having interests to each other, even if the signature and seal data are converted to digital signals for transmission, they may be easily copied and hence they cannot be used for authenticity. Accordingly, the authenticity of the message by digital signature which corresponds to the normal signature and seal is required. In order for the message authenticity to be effective as a formal transaction in place of the signature or seal, the following four conditions should be met.

(a) Only the transmitter can prepare a signed message such as a contract. It cannot be forged by a third person.

(b) The receiver cannot alter the signed message.

(c) The transmitter cannot later deny the fact of transmission which includes the indication that he/she has approved of the content of the message.

(d) The receiver cannot later deny the fact of reception which includes the indication that he/she has approved the content of the message.

(e) In the signing contract process, troubles such as data mismatching can be adequately arbitrated.

The following methods have been proposed to achieve the digital signature.

(1) Digital signature which uses conventional cryptograph (2) Digital signature which uses public key cryptograph (3) Digital signature by hybrid system Characteristics and problems relating to those three methods are described below.

(1) Digital signature which uses conventional cryptograph

Many digital signature methods which use the DES (data encryption standard) system cryptograph have been proposed but notarization is required or the receiver can alter the signed message because the transmitting station and the receiving station have a common authenticity key. Accordingly, no practical signature system has been known.

(2) Digital signature which uses public key cryptograph

The digital signature can be relatively easily attained by using the public key cryptograph system represented by an RSA (Rivest-Shamir-Adleman) algorithm.

FIG. 1 shows a chart of a prior art digital signature by the public key cryptograph.

In a step 101, a message M from a sender A is inputted.

In a step 102, a decoded message D (M, $SK_A$) is produced by decoding (deciphering) the message M by a secret key $SK_A$ of the sender A.

In a step 103, the decoded message D (M, $SK_A$) is further encoded (enciphered) by a public key $PK_B$ of a receiver B to produce a cryptograph message L=E (D (M, $SK_A$), $PK_B$), which is sent to the receiver B.

In a step 104, the data L received by the receiver B is decoded by the secret key $SK_B$ of the receiver B to produce D (M, $SK_A$).

In a step 105, the decoded message D (M, $SK_A$) is encoded by the public key $PK_A$ of the sender A to produce the original message M.

In a step 106, the message M is supplied to the receiver B as output data.

In the present flow chart, the cryptograph message M cannot be decoded in the step 104 unless the secret key $SK_B$ is known. Only the receiver B knows $SK_B$. In the step 102, only the sender A who knows the secret key $SK_A$ can produce D (M, $SK_A$). Accordingly, it is assumed that it is A that has sent the message M and it is B that has received the message.

When the message M is not a conventional sentence but random data, it is difficult to determine whether M is proper or not. As an approach thereto, an identifier of the sender, an identifier of the receiver, a serial number of the message and a date may be sent together with the message. In this case, an unauthorized act such as copying the signed message for repetitive transmission is prevented.

However, in the RSA system, the encoding and decoding time is long because of the complexity of the operations and a time-consuming problem will arise when the message is long.

(3) Digital signature by hybrid system

This system utilizes the advantages of the DES cryptograph system and the RSA cryptograph system in a well-mixed manner.

In this system, the conventional (ordinary) message is sent by the DES cryptograph communication and the transmission of the key and the authenticity utilize the RSA system. The message to be authenticated (validated) is first compression-decoded by the DES system to determine the Hash Total. FIG. 2A shows a process therefor. In FIG. 2A, the following steps are carried out.

Step 1:

First 64 bits of an input message I are defined as $I_1$. The $I_1$ portion is encoded by an encoder 21 by using a cryptograph key K. The encoded result is defined as $O_1$.

$$E_k(I_1) \rightarrow O_1$$

The 64 bits of an input message subsequent to the first 64(i−1) bits are defined as $I_i$.

Step 2:

Next 64 bits of the input message which follow portion $I_i$ are defined as $I_{i+1}$. An exclusive OR circuit 22 exclusively ORs $I_{i+1}$ and $O_i$ and an output thereof is encoded by the encoder 21 by using the key K.

$$E_k(I_{i+1}+O_i) \rightarrow O_{i+1}$$

Step 3:

If i<n−1, i is incremented by one and the process returns to the step 2. If not i<n−1, $O_{i+1}=O_n$ is outputted and the process is terminated. The RSA system digital signature is effected only for the data having the finally produced cryptograph block (Hash total) $O_n$ and data information added thereto.

In this system, even the digital signature to a long message can be processed in a short time.

However, the above systems do not meet the above-mentioned condition (c) of the digital signature, that is, "the sender cannot later deny the fact of transmission".

In the system which uses either the conventional cryptograph or the public key cryptograph, if the sender falsely insists that the secret key has been stolen and someone has prepared data without authorization, it is difficult to determine whether this allegation is true or not.

If the secret key has been actually stolen, it turns out that all messages signed before are uncredible. Accordingly, in the digital signature, there is a severe requirement that the secret key must be absolutely protected.

As described above, the condition (c) is not met so long as the signatures are made by only the two persons, the sender and the receiver.

It has been proposed to meet the condition (c) by communicating through a reliable authentication (notary) organization. FIG. 3 illustrates a principle thereof.

In FIG. 3, a sender 34 sends data consisting of a message and signature to an authentication organization 31. The authentication organization 31 adds date information to the received data 35 to prepare data 32, which is sent to a receiver 33 and is also recorded in a log 37. The sender 34 cannot later deny his message because the record is logged in the log 37 of the authentication organization 31. In this case, the sender may insist that the secret key has been stolen and someone has forged the message. Such insistence can be prevented by sending the same data 36 as the data 32 back to the sender 34 for confirmation.

Other problems relate to who the authentication organization should be and (ii) a large volume of message to be recorded.

The problem (i) is that the authentication organization should be operated at every time when the message is exchanged between the sender and the receiver. In a large network, the overhead for the authentication organization becomes very large. The problem (ii) is overcome by introducing Hash total.

As a modification of (3), a method for determining a Hash total by data compression encoding by DES in the hybrid digital signature is explained with reference to FIG. 4.

In FIG. 4, the following steps are carried out. Step 201:

An input message M is divided into n 56-bit blocks M1, M2, . . . Mn. Here the authentication organization usually does not intervene except for trouble time.

$$M = M1, M2, \ldots Mn$$

Step 202:

A parity bit is added to every seven bits of Mi (i=1, 2, . . . n) to produce Ki (i=1, 2, . . . n).

Step 203:

The following step is repeated for j=1, 2, . . . n.

I(j−1) is encoded by using Kj as a cryptograph key, and the encoded result and I(j−1) are exclusively ORed to produce I(j).

$$I(j) \leftarrow I(j-1) \oplus E_{Kj}(I(j-1))$$

where I(o) is an initial value.
Step 204:

$$H(M) = I(n)$$

Digital signature by the RSA system is applied to the resulting cryptograph block compression encoded message H(M).

Furthermore, this method does not meet the above-mentioned condition (e). If the sender sends a digital signature E (H(M), $S_K$) without the agreement of the receiver, the signature is not easily teared away because it is easily replicated.

Referring to FIG. 2B, a method of digital signature by the hybrid system is explained.

A sender 301 calculates a short character string H(M) from a message M 302 by data compression encoding, produces a digital signature E (H(M), $S_k$) 306 by an encoder 305 by using a secret key $S_k$ 304 and sends it to a receiver 307. In order for the receiver 307 to recognize that the message 302 and the digital signature 306 are true and valid, the receiver 307 decodes the digital signature E (H(M), $S_k$) 306 by a decoder 309 to produce the original character string H(M)' 310, and calculates a character string H(M)" 311 from the message 302 in the same manner as the sender 301 did. Both are compared by a comparator 312 and if they are equal, the message 302 is true and valid so long as the receiver believes that the sender 301 is a sole owner of the secret key $S_k$ 304.

In this method, the digital signature to a long message can be processed in a short time, but this method does not meet the condition (d) (the receiver cannot later deny the fact of reception). If the receiver later denies the fact of reception, the sender has no evidence to refute it.

SUMMARY OF THE INVENTION

It is an object of the present invention to provide an electronic transaction which eliminates the disadvantages in the digital signature encountered in the prior art system, includes the function of an authentication organization, reduces the quantity of the message to be recorded concerning the content of a contract, for example and meets the following conditions.

(1) Only a sender can prepare a signed message. It cannot be forged by a third party.

(2) A receiver cannot alter the signed message.

(3) The sender and receiver cannot later deny the facts of transmission and reception, respectively.

In order to achieve the above object, one feature of the present invention includes the following steps.

① Sender and receiver are checked.

② Content certificate function is added.

③ The sender or receiver is double-checked by the possession of a secret key and a terminal response.

④ A grace period is added to the electronic seal.

⑤ A tally impression is sent from the receiver back to the sender.

DESCRIPTION OF THE PREFERRED EMBODIMENTS

Figure 1:
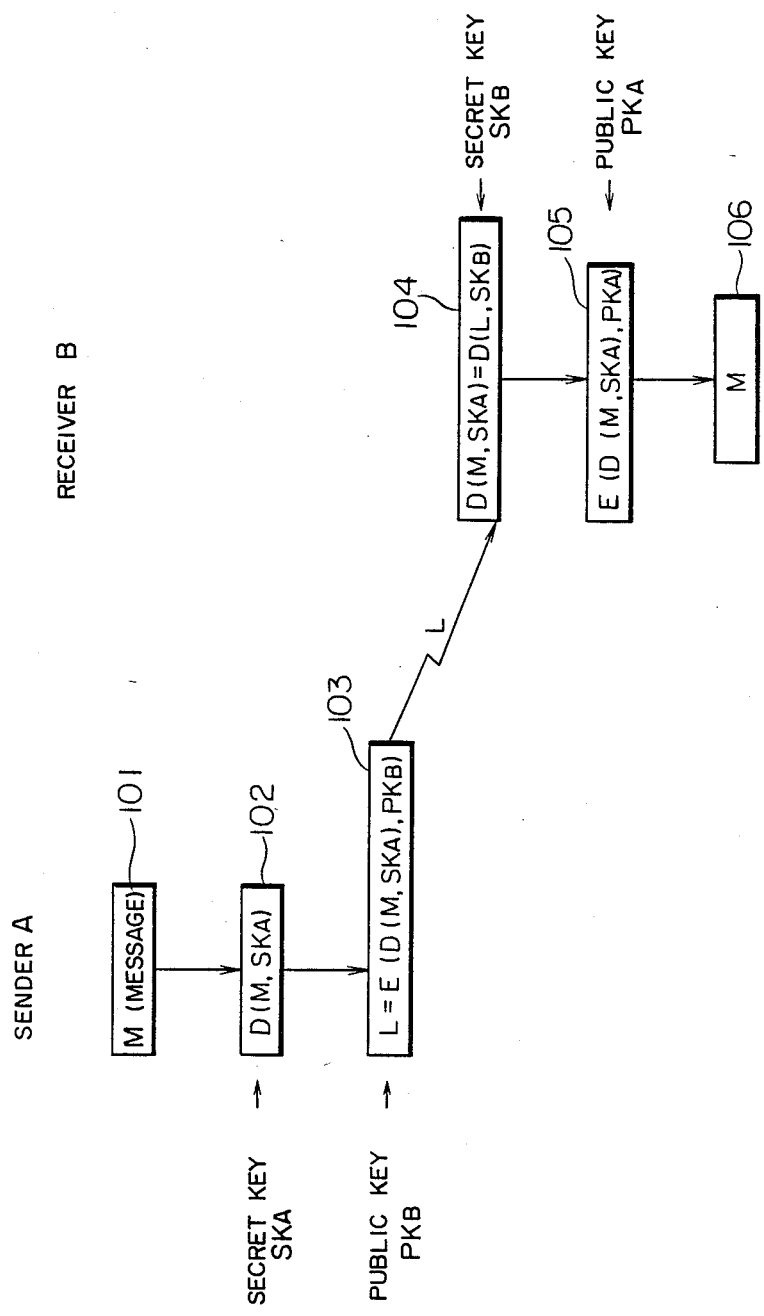
FIG. 1 is a flow chart of a prior art digital signature procedure which uses a public key cryptograph system.

In order to facilitate the understanding of the present invention, the contents of the above items ① ~ ⑤ are explained in detail.

① Confirmation of sender and receiver

In the following description, the sender of the transaction message is referred to as a signer and the receiver is referred to as a certifier.

Two sets of keys i. e., a public key and a secret key in the public key cryptograph system, are prepared. They are (public key, secret key) : ($PK_S$, $SK_S$) and ($PK_R$, $SK_R$), where $SK_S$ is owned only by the signer and $SK_R$ is owned only by the certifier, and $PK_S$ and $PK_R$ are copied to all concerned.

Assuming that a message M consists of m binary bits, the following is met in the public key cryptograph system.

$$M = E(D(M, SK_S), PK_S) = E(D(M, SK_R), PK_R) \quad (1)$$

where D (*, K) is a message decoded from a message * by a key K, and E (*, K) is a cryptograph encoded from the message * by the key K. The same message is supplied to the signer and the certifier, who decode it by their own secret keys and the decoded results D (M, $SK_S$) and D (M, $SK_R$) are disclosed to the persons concerned, who encode D (M, $SK_S$) and D (M, $SK_R$) by using the signer's and certifier's public keys $PK_S$ and $PK_R$ which the persons concerned possess. The persons concerned can confirm that the formula (1) is met if the signer and the certifier properly used their secret keys. If the formula (1) is not met, the persons concerned may determine that the secret key of the signer or the certifier is not valid.

For example, if the signer forges the signed message by using a false secret key $SK_S'$ ($\neq SK_S$), $$E(D(M, SK_S') \neq E(D(M, SK_S), PK_S) \; E(D(M, SK_S') \; PK_S) \neq E(D(M, SK_R), PK_R) \quad (2)$$

Thus, the persons concerned may determine that the secret key used by the signer or the certifier is an unauthorized one.

It is very rare that the formula (1) is met in spite of the fact that the signer or the certifier forged the signed message by using the false secret key, because, assuming that the length of the message M is 200 bits, a probability that the formula (1) is met by the false secret key S is $\frac{1}{2}^{200} \approx 6 \times 10^{-61}$, which is negligibly small.

It is difficult for a third person to steal the secret key of the signer or certifier and transact as if he were the signer or certifier, because the true signer and certifier, who are also the persons concerned, can detect a third person who transacts in place of the signer or certifier once the D (M, $SK_S$) or D (M, $SK_R$) is disclosed.

Where the key K for D (*, K) is kept in secret, it is difficult for a third person who is unaware of the secret key K to forge a key K' for the message M to meet D (M, K)=D (M, K').

The D (M, K) thus prepared is hereinafter referred to as an electronic seal by the owner of the secret key K, and the message M for certifying the validity or authenticity of the electronic seal is referred to as certificate data. If a person who received the electronic seal has a corresponding public key, he/she can detect who prepared the electronic seal and the content of the message. However, a person other than the owner of the secret key K cannot produce the electronic seal D (M, K) based on the certificate data M. The same certificate data is decoded by the signer and certifier by their respective secret keys and the decoded results D (M, $SK_S$) and D (M, $SK_R$) are exchanged between them. The certifier can confirm that the sender of D (M, $SK_S$) is the signer himself if the certifier can get M in accordance with the formula (1) by encoding D (M, $SK_S$) by the public key $PK_S$ of the signer. The signer can also confirm that the sender of D (M, $SK_R$) is the certifier himself if the signer can get M in accordance with the formula (1) by encoding D (M, $SK_R$) by the public key $PK_R$ of the certifier. When the persons concerned are presented with D (M, $SK_S$) and D (M, $SK_R$) from the signer or certifier, they encode D (M, $SK_S$) and D (M, $SK_R$) by using the public key $PK_S$ of the signer and the public key $PK_R$ of the certifier. The persons concerned can determine whether the secret key used is authorized one or not by checking if the formula (1) is met or not.

② Addition of content certificate function

Figure 2A:
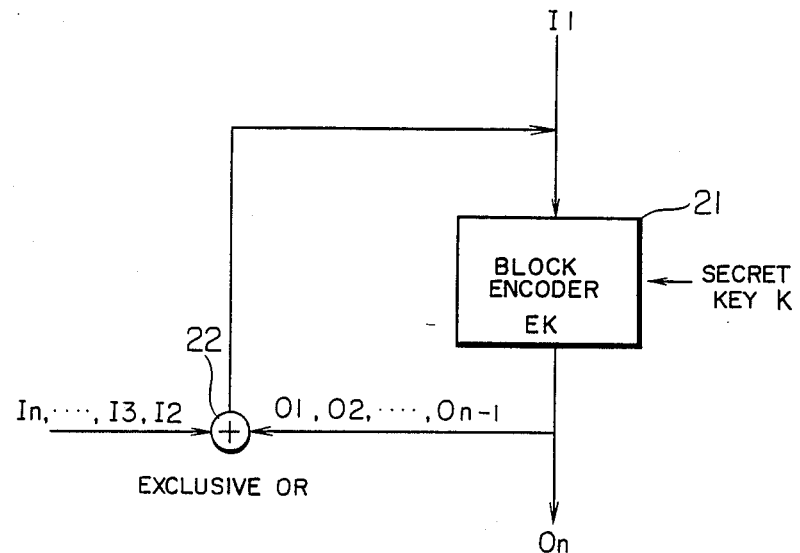
FIGS. 2A, 2B and 4 show principles of known data compression cryptograph.
Figure 3:
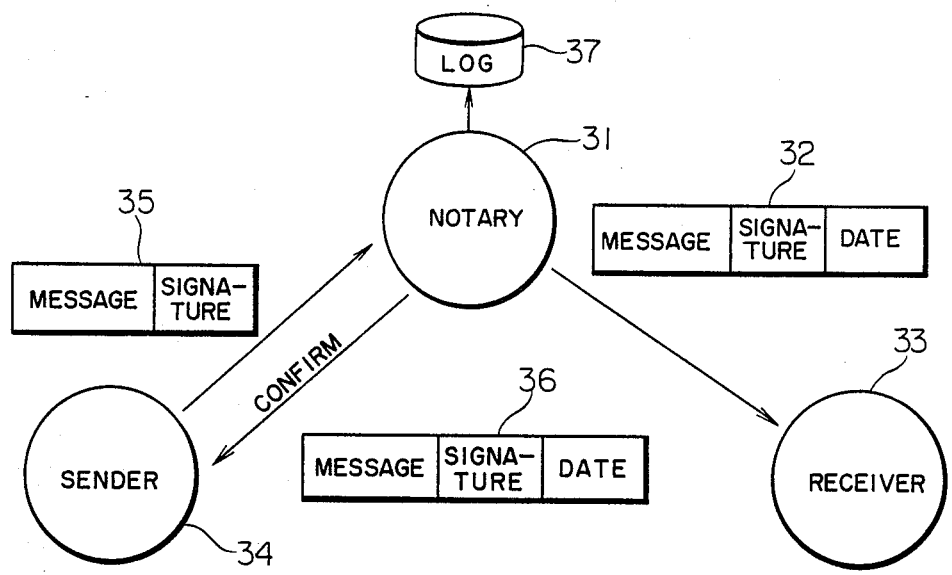
FIG. 3 shows a prior art digital signature system which uses an authentication organization.
Figure 2B:
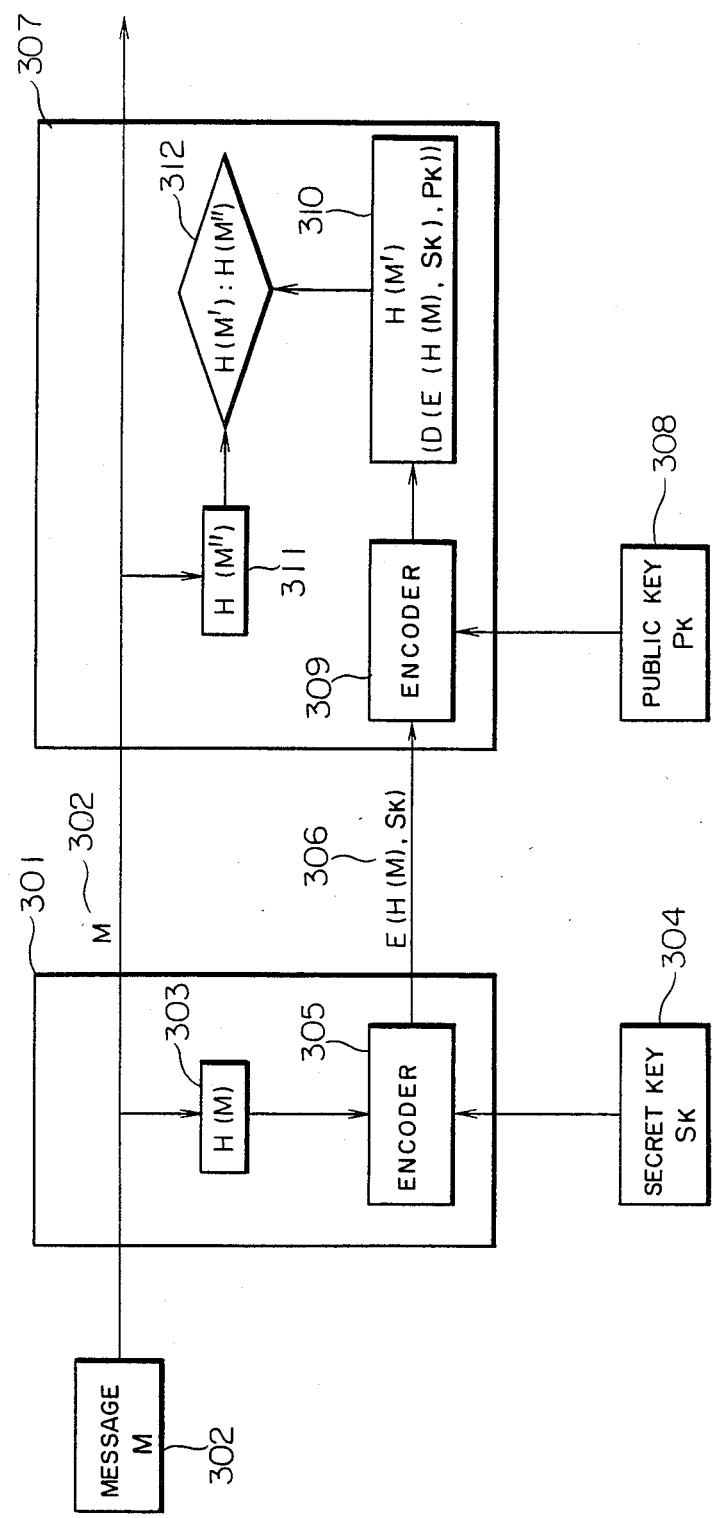
Figure 4:
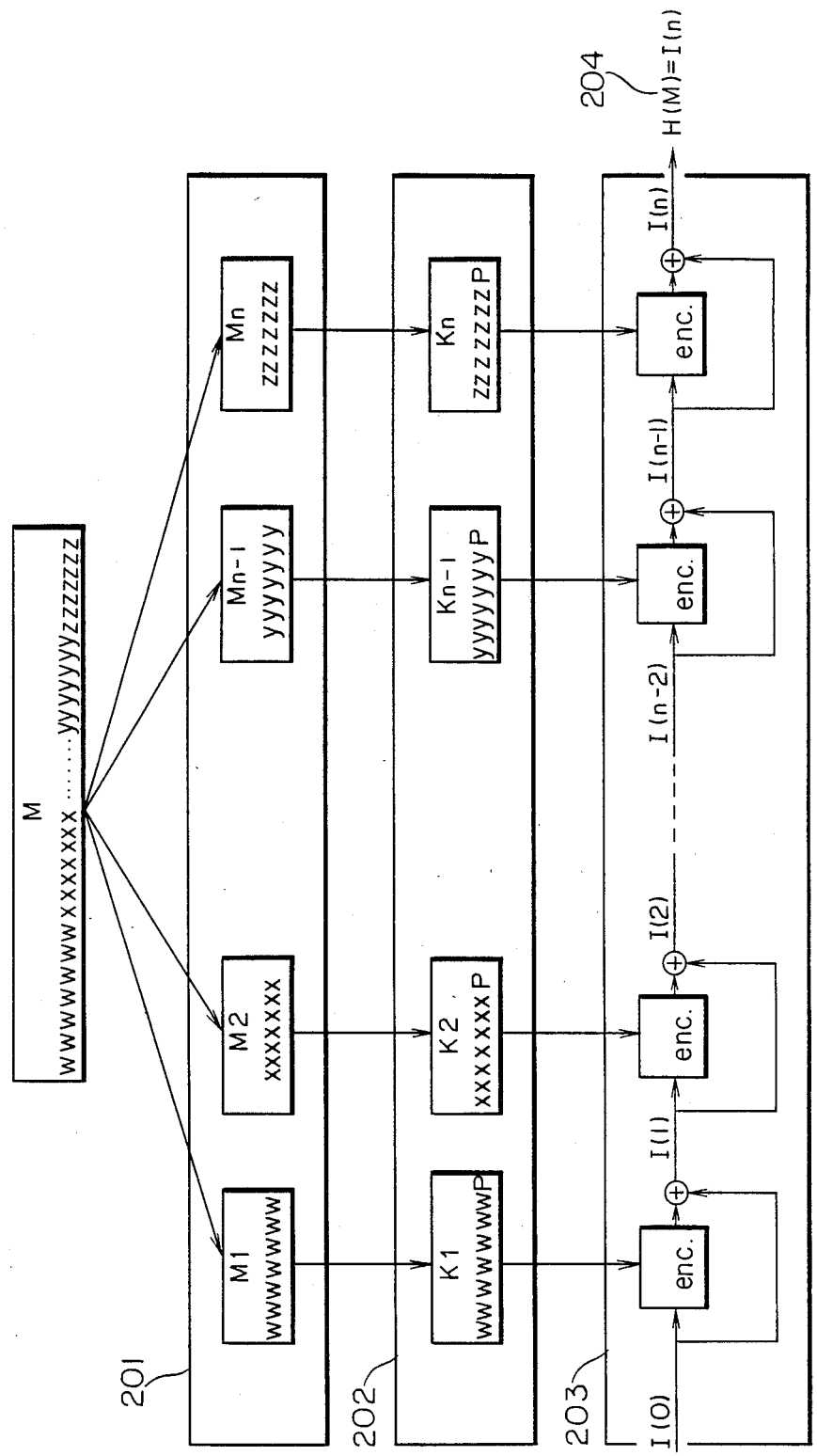

In order to certify the content of the transmitted data, a message I is data compression encoded (FIG. 2) by using the key K. High order m bits of the finally produced block $O_n$ are used as a Hash total (I, K) for the message I.

Assuming that m=64 and different messages I and I' are data compression encoded, a probability of $$C(I', K) = C(I, K) \quad (3)$$

is $\frac{1}{2}^{64} \approx 5 \times 10^{-20}$, which is almost null.

When the signer sends a message, he/she data-compression-encodes it and opens the Hash total (data compression encoded message) to the persons concerned. The signer and certifier keep the originals of the message. Thus, if an issue later occurs on the original, the original may be again data-compression-encoded to check whether it matches the initial original.

The message I may be used as an encoding key in an encoding system for certifying the content. A predetermined input data I0 is encoded by the encoding key to produce a Hash total C (I0, I). In the present encoding system, it is difficult to determine the encoding key I from the input data IO and the output data C (IO, I) which both have been received.

Assuming that the length of the output data is 64 bits and different messages I and I' are used as the encoding key, a probability of $$C(IO, I') = C(IO, I) \quad (4)$$

is $\frac{1}{2}^{64} \approx 5 \times 10^{-20}$, which is almost null.

The C (IO, I) is inserted in the certificate data at a predetermined position so that C (IO, I) is reproduced from the certificate data. When the signer, certifier or person concerned gets the message I' and C (IO, I), he/she first encodes the data IO by using the message I' as a key, and then compares the encoded result or Hash total C (IO, I') with C (IO, I). If they are equal, it means that the given message I' is equal to the original message I, and if they are not equal, it means that the given message I' is not equal to the original data I.

③ Double check of the signer and certifier by the possession of the secret key and the terminal response The transaction procedure is established such that the signer and certifier respond to the call from the partner before they input their own secret keys. Thus, if the secret key is stolen by a third person, who intends to initiate an electronic transaction, at least one call is made by the signer or certifier before the transaction is executed. Accordingly, the signer or certifier can detect the third person's involvement.

He/she indicates this fact to the authentication organization together with the electronic seal and tally impression so that the electronic seal and tally impression are invalidated. Thus, if the signer or certifier intentionally attempts to delay the execution of the transaction by not returning the response, the authentication organization indicates that the electronic seal and tally impression so far exchanged are invalid and the transaction has been terminated. Accordingly, safety in the transaction procedure is assured.

④ Addition of grace period for electronic seal

When the signer or certifier prepares his/her electronic seal and tally impression, he/she adds a grace period date for the electronic seal and tally impression at a predetermined position on the certificate data. This indicates to the partner of the transaction who received the electronic seal and tally impression that a grace period has been established during which the partner is permitted to terminate the transaction. Before or during the grace period, the partner can terminate the transaction and declare that the electronic seal and tally impression so far exchanged are invalid. Thus, if the signer or certifier finds any defect in the transaction or finds that the electronic seal or tally impression received from the partner is unauthorized, after the signer or certifier has sent the electronic seal and tally impression, he/she indicates this fact to the authentication organization together with the electronic seal and tally impression so that the electronic seal and tally impression are invalidated. Thus, if an invalid transaction is made or if an opposition is lodged to the received electronic seal or tally impression, the authentication organization will indicate that the electronic seal and tally impression so far exchanged are invalid and the transaction has been terminated. Accordingly, safety in the transaction procedure is assured.

⑤ Transmission of tally impression from certifier to signer

When the certifier receives the message M from the signer and confirms the content of the message M and agrees to the transaction, he/she makes a kind of digital signature which is different from the electronic seal. That is, he/she prepares Hash totals $h_1 = H_1(M)$ and $h_2 = H_2(M)$ for a predetermined data IO, and combines a high order bit sequence $h_1$ with a time data T to produce a tally impression certificate data $(T, h_1)$. Here, $h_1 \neq h_2$, and $h_1$ is for tally and $h_2$ is for electronic seal. The tally impression certificate data is decoded by the secret key $SK_R$ of the certifier to prepare an electronic tally impression $D((T, h_1), SK_R)$, which is sent to the signer as a response of agreement to the transaction by the message M. The signer encodes the electronic tally impression $D((T, h_1), SK_R)$ by the public key $PK_R$ of the certifier to produce the original tally impression certificate data $E(D((T, h_1), SK_R), PK_R) = (T, h_1)$. The signer confirms the fact that the high order bit sequence $h_1$ of the Hash total of the message M is included in the electronic seal which can be prepared only by the certifier, and the signer may use it as rebuttal evidence when the certifier later denies the fact of the transaction and does not send back the electronic seal of the certifier and escapes with the electronic seal of the signer.

The present invention is now explained for specific embodiments.

Figure 5:
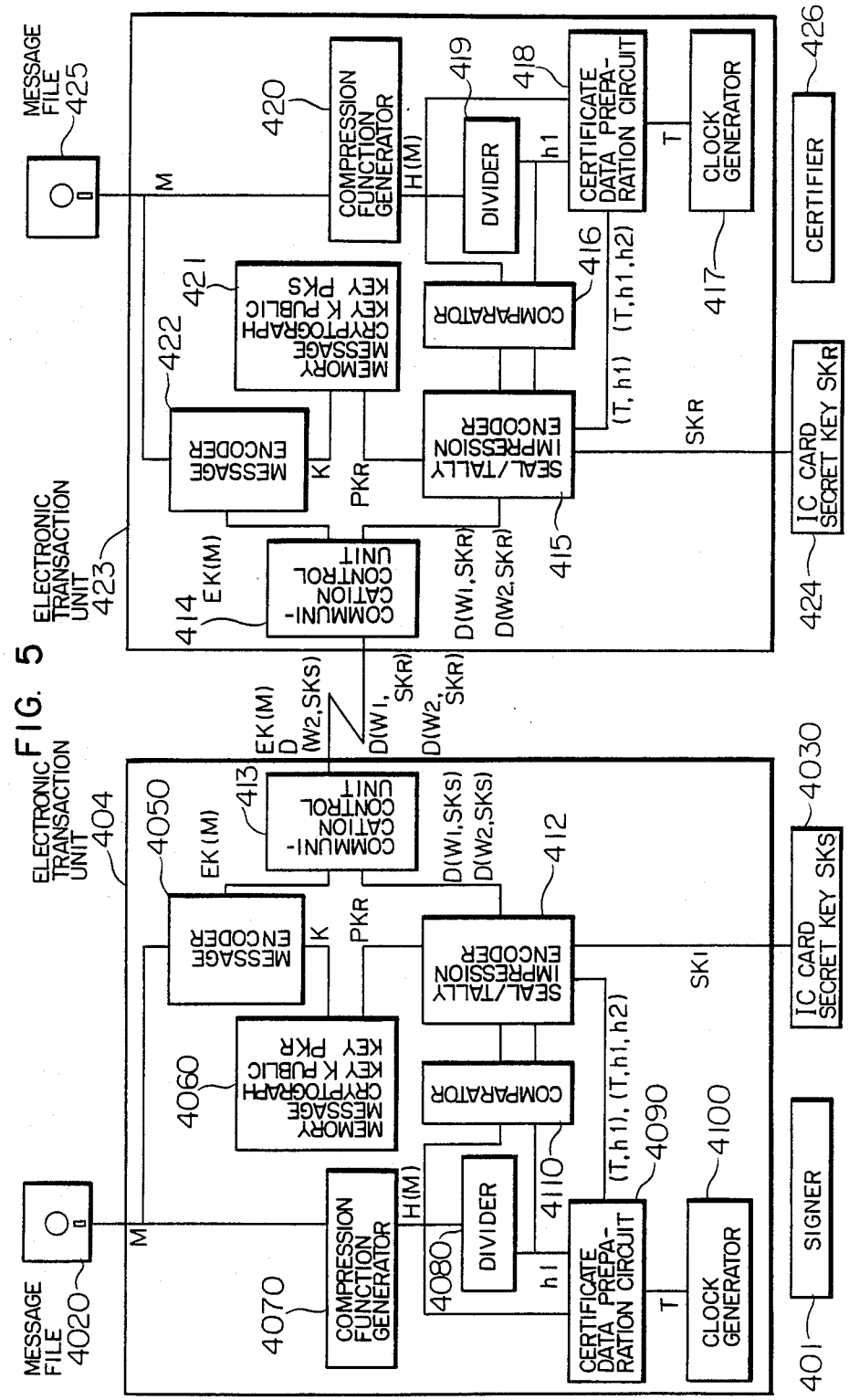
FIG. 5 shows a system configuration of the electronic transaction system to which the present invention is applied.
Figure 6:
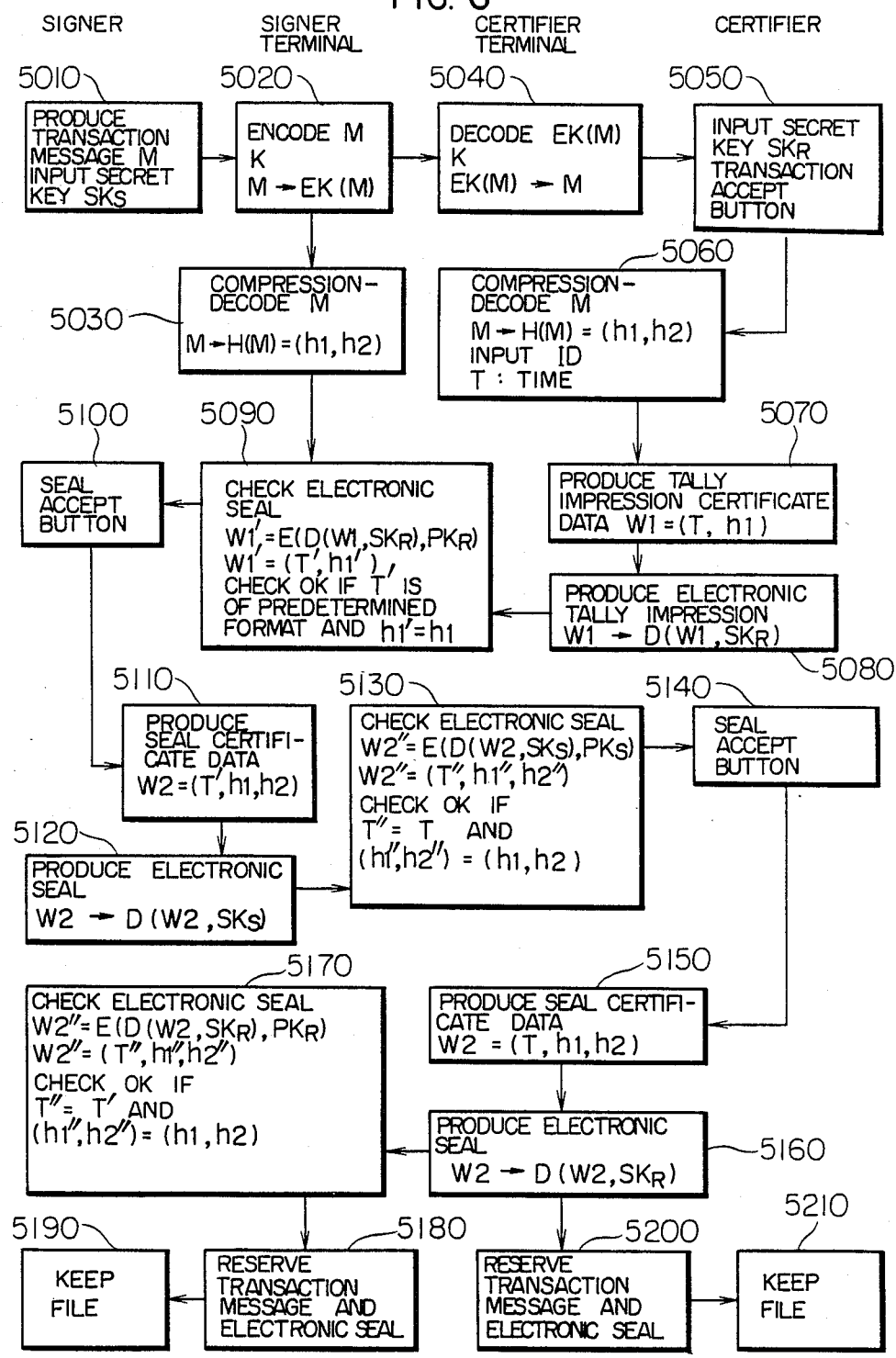
FIG. 6 shows a flow chart of a procedure of a first embodiment of the present invention.

FIG. 5 shows configuration of the electronic transaction system to which the present invention is applied, and FIG. 6 shows a flow chart of a procedure in a first embodiment of the present invention in the configuration of FIG. 5.

The operations of the elements of FIG. 5 are explained with reference to the flow chart of FIG. 6.

Step 5010:

The signer 401 enters the transaction message M from a message file 4020 to a signer electronic transaction unit 404, and enters his/her secret key $SK_S$, the name of signer 401 and the name of the certifier 426 by an IC card 4030.

Step 5020:

The signer electronic transaction unit 404 encodes the transaction message M by using the message cryptograph key K of a memory 4060 to prepare EK(M) in a message encoder 4050 and sends EK(M), the name of the signer 401 and the name of the certifier 426 to the certifier electronic transaction unit 423 through a communication control unit 413.

Step 5030:

The signer electronic transaction unit 404 prepares a compressed cryptograph H(M) by a compression function generator 4070 by using the transaction message M as a cryptograph key.

(1) H(M) is in 8-bit output data derived by compression-encoding an 8-bit input data I(O) by an 8-bit cryptograph key K1. The cryptograph system has been predetermined. In this cryptograph system, it is difficult to determine the cryptograph key K1 based on the input data I(O) and the output data H(M).

(2) The transaction message is sectioned into n 56-bit blocks M1, M2, ... Mn. If the length of the last block Mn does not reach 56 bits, bits "O" are added until the length of the block Mn reaches 56 bits.

(3) One parity bit is added to every seven bits of the blocks so that the block length is expanded to 64 bits. The expanded blocks are designated by K1, K2, ... Kn.

(4) The input data I(i−1) is encoded by the key Ki, and the encoded result is exclusively ORed with I(i−1) to produce I(i).

$$I(i) = I(i-1) + EKi(I(i-1))$$

The above process is repeated for i = 1, 2, ... n. The initial value I(O) is predetermined.

(5) The finally determined I(n) in the step (4) is used as H(M), which is divided into high order and low order data h1 and h2.

$$H(M) = (h1, h2) = I(n)$$

Step 5040:

The certifier electronic transaction unit 423 decodes the encoded message EK(M) by using the message encoder 422 and the cryptograph key K.

$$M = DK(EK(M))$$

It indicates the transaction message M to the certifier 426.

Step 5050:

The certifier 426 watches the transaction message M decoded in the step 5040, and if he/she judges that the transaction may proceed, he/she enters his/her secret key $SK_R$ by the IC card 424.

Step 5060:

The certifier electronic transaction unit 423 compression-encodes the transaction message M by using the compression encoder 420 in the same manner as the step 5030 to prepare H(M)=(h1, h2). It also prepares data in a predetermined format as an ID T by a clock generator 417. In the present example, the ID T may be a current time, for example, "15:53:12 April 11, 1985".

Step 5070:

A tally impression certificate data W1 is prepared by a certificate data preparation circuit 418 from the ID T and the high order data h1 derived from the encoded data H(M) by a divider 419.

$$W1=(T, h1)$$

Step 5080:

The tally impression certificate data W1 is decoded by the seal/tally impression encoder 415 by using the secret key $SK_R$ by the predetermined public key cryptograph system to prepare D (W1, $SK_R$), which is sent to the signer electronic transaction unit 404.

Step 5090:

The signer electronic transaction unit 404 encodes D (W1, $SK_R$) by the seal/tally impression encoder 412 by using the certifier public key $PK_R$ of the memory 4060 to prepare W1'=(E (D(W1, $SK_R$), $PK_R$). The encoded result W1' is compared by the comparator 4110. if T' matches the predetermined format and h1' is equal to h1 prepared in the step 5030, it is judged that the certifier 426 himself/herself is present at the certifier electronic transaction unit 423. In the present example, the content of T' is equal to that of T, that is, "15:53:12 April 11, 1985" and the above judgement is made.

Step 5100:

The signer 401 notifies that the certifier 426 himself-/herself is at the certifier electronic transaction unit 423 and the certifier 426 has decided to accept the transaction for the transaction message M. The signer 401 depresses the seal accept button of the signer electronic transaction unit 404 to prepare his/her electronic seal.

Step 5110:

The signer electronic transaction unit 404 enters (h1, h2) prepared in the step 5030 and T' prepared in the step 5090 to the certificate data preparation circuit 4090 to prepare the tally certificate data W2.

$$W2=(T', h1, h2)$$

Step 5120:

The tally impression certificate data W2 is decoded by the seal/tally impression encoder 412 by using the secret key $SK_S$ by the predetermined public key cryptograph system to prepare D (W2, $SK_S$), which is sent to the certifier electronic transaction unit 423.

Step 5130:

The certifier electronic transaction unit 423 encodes D (W2, $SK_S$) by the seal/tally impression encoder 415 by the signer public key $PK_S$ of the memory 421 to prepare W2".

$$W2''=E (D(W2, SK_S), PK_S)$$

The comparator 4160 checks if T"=T and (h1", h2")=(h1, h2) when W2"=(T", h1", h2"), and indicates the result to the certifier 426.

Step 5140:

When the certifier 426 confirms that the result in the step 5130 is "T"=T and (h1", h2")=(h1, h2)", he/she judges that D (W2, $SK_S$) has been prepared by the signer himself/herself based on the transaction message M, and decides to prepare and send the electronic seal of the certifier. He/she depresses the electronic seal prepare/send button of the certifier electronic transaction unit 423.

Step 5150:

The certifier electronic transaction unit 423 prepares the seal certificate data W2 by the certificate data preparation circuit 418 from (h1, h2) and T prepared in the step 5060.

Step 5160:

The certifier electronic transaction unit 423 decodes W2 by the seal/tally impression encoder 415 by using the certifier secret key $SK_R$ of the IC card 424 by the public key cryptograph system to prepare D (W2, $SK_R$), which is sent to the signer electronic transaction unit 404.

Step 5170:

The signer electronic transaction unit 404 encodes D (W2, $SK_R$) by the seal/tally impression encoder 412 by using the certifier public key $PK_R$ of the memory 4060 by the public key cryptograph system to prepare W"'.

$$W2'''=E (D(W2, SK_R), PK_R)$$

If the comparator 411 indicates that T"=T' and (h1", h2")=(h1, h2) when W2"=(T", h1", h2"), it is judged that D (W2, $SK_R$) has been prepared by the certifier 426 himself/herself based on the transaction message M.

Step 5180:

The certifier electronic transaction unit 404 records the transaction message M, the electronic seal D (W2, $SK_R$) of the signer 401 and the electronic seal D (W2, $SK_S$) and tally impression D (W2, $SK_R$) of the certifier 426 in the message file 4020, and terminates the operation.

Step 5190:

The signer 401 keeps the message file 4020.

Step 5200:

The certifier electronic transaction unit 423 records the transaction message M, the electronic seal D (W2, $SK_S$) of the signer 401 and the electronic seal D (W2, $SK_R$) and tally impression D (W2, $SK_R$) of the certifier 426 in the message file 425, and terminates the operation.

Step 5210:

The certifier 426 keeps the message file 425. Modification 1 of the embodiment

In the steps 5010 and 5050 of the present embodiment, a portion of the information relating to the secret key is recorded in a magnetic card or IC card and the rest of the information of the secret key is memorized by the signer or certifier as a secret number. When the secret key $SK_S$ or $SK_R$ is to be entered, it is inputted by reading the information from the magnetic card or IC card and keying the secret number by the secret key $SK_S$ or $SK_R$. Modification 2 of the embodiment In the step 5010, 5050, 5100 or 5140 of the present embodiment, the terminal may confirm the person by a voice pattern or fingerprint before the signer or certifier enters the information.

In the present modification, the signer or certifier cannot escape with the electronic seal because of the tally impression check. If the certifier does not send the certifier's electronic seal D (W2, $SK_R$) and denies the transaction after the signer has sent the signer's electronic seal D (W2, $SK_R$) when the signer and the certifier electronically transact the transaction message M, the signer may prove that the certifier attempts to deny the fact of transaction and escape with the signer's electronic seal by decoding the tally impression by the public key $PK_R$ of the certifier and checking the content thereof. The tally impression D (W1, $SK_R$) sent by the certifier to the signer prior to the exchange of the electronic seal includes the high order data h1 of H(M)=(h1, h2) prepared by compression-encoding the transaction message M sent by the signer.

$$W1=(T, h1)$$

It is difficult to prepare the secret key which meets $$D (W1, SK_R')=D (W1, SK_R)$$

for the same reason that a third person cannot conduct the transaction as if he/she were the certifier. Accordingly, it is only the certifier who has the secret key $SK_R$ that can prepare the tally impression which includes the high order data of the compression-encoded message of the transaction message M.

Figure 7:
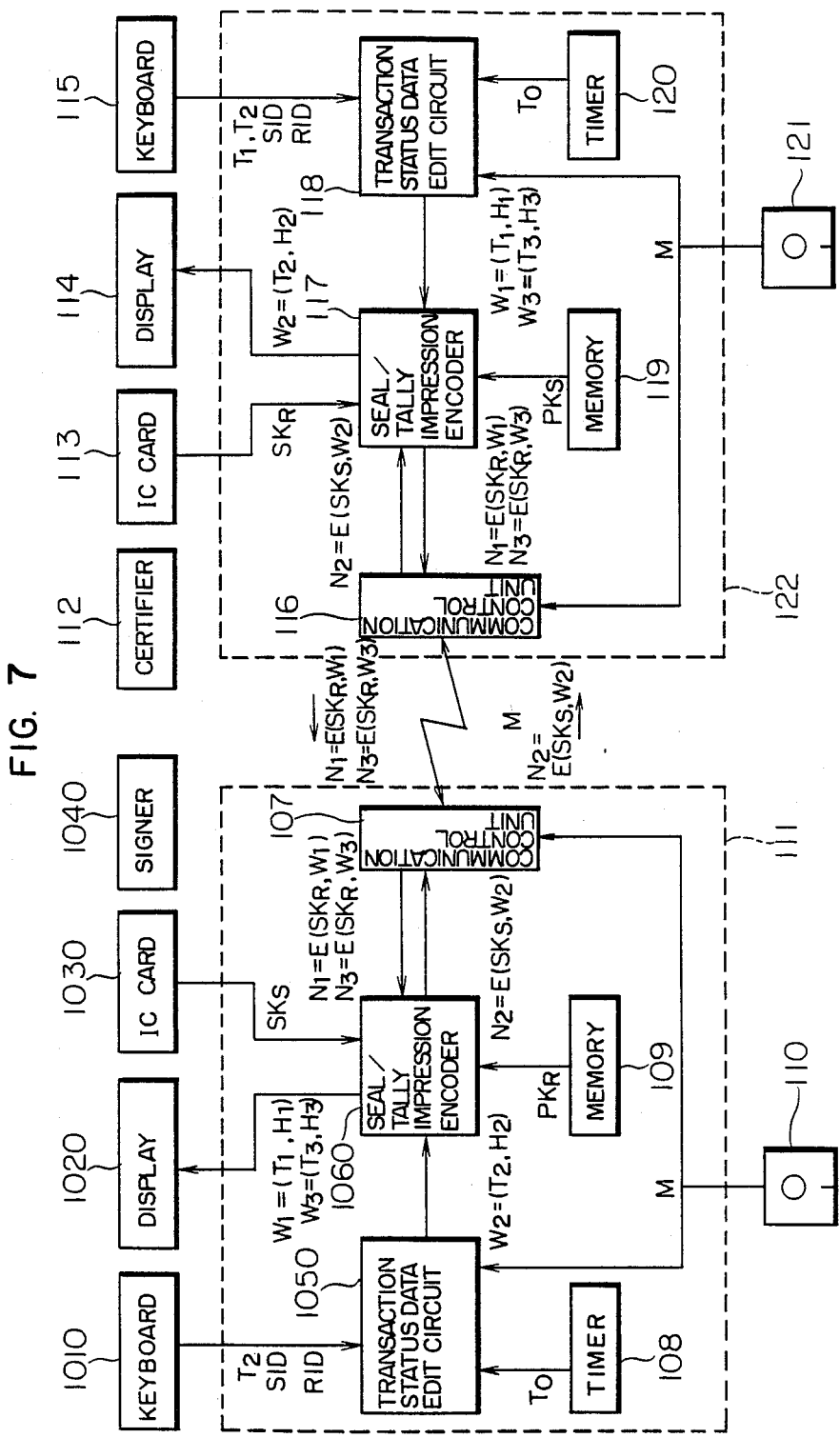
FIG. 7 shows another system configuration of the electronic transaction system to which the present invention is applied.
Figure 8:
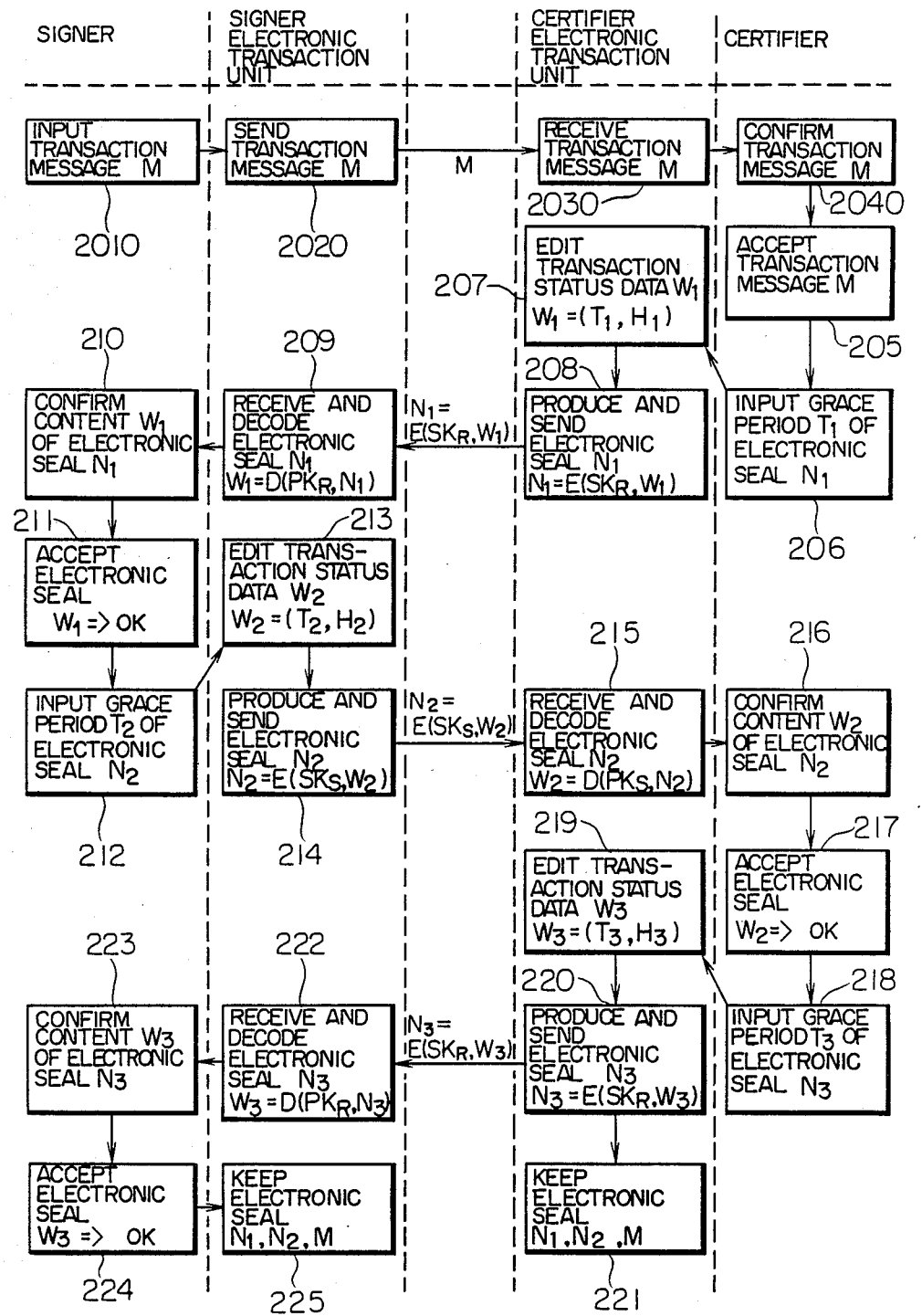
FIG. 8 shows a flow chart of a procedure of a second embodiment of the present invention.

FIG. 7 shows another configuration of the system of the present invention, and FIG. 8 shows a flow chart of a procedure in a second embodiment of the present invention in the configuration of FIG. 7. Operations of elements in FIG. 7 are explained with reference to the flow chart of FIG. 8.

Step 2010:
The signer 104 enters the transaction message M from the message file 110 to the signer electronic transaction unit 111.

Step 2020:
The signer electronic transaction unit 111 sends the input transaction message M to the certifier electronic transaction unit 122 by the communication control unit 107.

Step 2030:
The certifier electronic transaction unit 122 receives the transaction message M and displays it on the display 114.

Step 2040:
The certifier 112 confirms the transaction message M displayed on the display 114.

Step 205:
The certifier 112 reviews the content of the transaction message M and agrees to proceed with the transaction.

Step 206:
The certifier 112 enters the grace period $T_1$ of the certifier electronic tally impression $N_1$ and the sender/receiver ID to the certifier electronic transaction unit 122 through the keyboard 115.

Step 207:
The certifier electronic transaction unit 122 edits the input grace period $T_1$, sender/receiver ID, time information $T_0$ generated by the time 120 and information for identifying the content of the transaction message M through the transaction status data edit circuit 118 to prepare (produce) the transaction status data $W_1=(T_1, H_1)$.

Step 208:
The certifier electronic transaction unit 122 encodes the transaction status data $W_1$ by the seal/tally impression encoder 117 by using the secret key $SK_R$ of the certifier read from the IC card 113 to prepare (produce) the certifier electronic tally impression $N_1=E (SK_R, W_1)$, which is sent to the signer electronic transaction unit 111 by the communication control unit 116.

Step 209:
The signer electronic transaction unit 111 decodes the certifier electronic tally impression $N_1$ by the seal/tally impression encoder 1060 by using the public key $PK_R$ of the certifier registered in the memory 109 to prepare the transaction status data $W_1=D (PK_R, N_1)$, which is displayed on the display 1020.

Step 210:
The signer 1040 confirms the content of the transaction status data $W_1$ displayed on the display 1020 to check the validity thereof.

Step 211:
The signer 1040 decides to proceed with the transaction depending on the result of the validity check of the transaction status data $W_1$.

Step 212:
The signer 1040 enters the grace period $T_2$ of the signer electronic seal $N_2$ and the sender/receiver ID to the signer electronic transaction unit 111 by the keyboard 1010.

Step 213:
The signer electronic transaction unit 111 edits the input grace period $T_2$, sender/receiver ID, time information $T_0$ generated by the timer 108 and information for identifying the content of the transaction message M through the transaction status data edit circuit 1050 to prepare the transaction status data $W_2 32 (T_2, H_2)$.

Step 214:
The signer electronic transaction unit 111 encodes the transaction status data $W_2$ by the seal/tally impression encoder 1060 by using the secret key $SK_S$ of the signer read from the IC card 1030 to prepare the signer electronic seal $N_2=E (SK_S, W_2)$, which is sent to the certifier electronic transaction unit 122 by the communication control unit 107.

Step 215:
The certifier electronic transaction unit 122 decodes the signer electronic seal $N_2$ of the seal/tally impression encoder 117 by using the public key $PK_S$ of the certifier registered in the memory 119 to prepare the transaction status data $W_2=D (PK_S, N_2)$, which is displayed on the display 114.

Step 216:
The certifier 112 confirms the content of the transaction status data $W_2$ displayed on the display 114 to check the validity thereof.

Step 217:
The certifier 112 decides to proceed with the transaction depending on the result of the validity check of the transaction status data $W_2$.

Step 218:
The certifier 112 enters the grace period $T_3$ of the certifier electronic seal $N_3$ and the sender/receiver ID to the certifier electronic transaction unit 122 by the keyboard 115.

Step 219:
The certifier electronic transaction unit 122 edits the input grace period $T_3$, sender/receiver ID, time information $T_0$ generated by the timer 120 and information for identifying the content of the transaction message M through the transaction status data edit circuit 118 to prepare the transaction status data $W_3=(T_3, H_3)$.

Step 220:

The certifier electronic transaction unit 122 encodes the transaction status data $W_3$ by the seal/tally impression encoder 117 by using the secret key $SK_R$ of the certifier read from the IC card 113 to prepare the certifier electronic seal $N_3=E (SK_R, W_3)$, which is sent to the signer electronic transaction unit 111 by the communication control unit 116.

Step 221:

The certifier electronic transaction unit 122 keeps the transaction message M and the electronic seals $N_2$ and $N_3$ of both parties in the message file 121.

Step 222:

The signer electronic transaction unit 111 decodes the certifier electronic seal $N_3$ by the seal/tally impression encoder 1060 by using the public key $PK_R$ of the certifier registered in the memory 109 to prepare the transaction status data $W_3=D (PK_R, N_3)$, which is displayed on the display 1020.

Step 223:

The signer 1040 confirms the content of the transaction status data $W_3$ displayed on the display 1020 to check the validity thereof.

Step 224:

The signer 1040 decides to proceed with the transaction depending on the result of the validity check of the transaction status data $W_3$.

Step 225:

The signer electronic transaction unit 111 keeps the transaction message M and electronic seals $N_2$ and $N_3$ of both parties in the message file 110.

In the steps 211, 217 and 224 of the present embodiment, the grace period information indicating the period for permitting interruption of the transaction is included in the electronic seal and tally impression. If the party who received the electronic seal or tally impression lodges an opposition against the received electronic seal or tally impression within the grace period, he/she is ensured to invalidate the electronic seal or tally impression he/she already issued by reporting the termination of the transaction to the public organization by the third party. Thus, a dispute during and after the transaction can be prevented.

If the party who sent the electronic seal or tally impression wishes to terminate the transaction because something wrong was found later, the transaction can be terminated by reporting it to the public organization within the designated grace period. Thus, a wrong transaction is prevented.

The grace period may be set to any period by the sender of the electronic seal and tally impression while taking consideration the time necessary for the receiver to confirm the content. Thus, even if there is a difference between the processing speeds of the apparatus for preparing and checking the electronic seals and tally impression of both parties, the system can be flexibly operated. Thus, the safety of the transaction is assured for apparatus having different performances such as a personal computer and a large scale computer.

In accordance with the present invention, an unauthorized act by not only the parties but also by a third person is prevented and a highly reliable electronic transaction system is attained.

We claim:

1. An electronic transaction system for electronically sending and receiving digital signatures concerning a transaction message M between a first terminal for a first transacting party and a second terminal for a second transacting party, comprising:

A. in said first terminal:
first means for generating a Hash total $h'(M)$ of the transaction message M derived by compression-encoding said transaction message M and a Hash total $h(M)$ different from said Hash total $h'(M)$;
second means for preparing a digital signature $T(A)$ by encoding data including at least first data containing the Hash total $h'(M)$ and a first certificate not containing the transaction message M by using a secret key of the first transacting party, based on a public key cryptograph system;
third means coupled to the output of said second means for sending the prepared digital signature $T(A)$ from said first terminal to said second terminal;

B. in said second terminal:
fourth means for preparing a digital signature $S(B)$ by encoding data including at least second data containing the Hash total $h(M)$ different from the Hash total $h'(M)$ and a second certificate not containing the transaction message M by using a secret key of the second transacting party, based on said public key cryptograph system;
fifth means coupled to the output of said fourth means for sending the digital signature $S(B)$ from said second terminal to said first terminal; and C. in said first terminal:
sixth means responsive to reception of the digital signature $S(B)$ from said second terminal for encoding data including at least third data containing the Hash total $h(M)$ and a first certificate not containing the transaction message M by using the secret key of the first transacting party, based on said public key cryptograph system to obtain a digital signature $S(A)$ and for sending the digital signature $S(A)$ from said first terminal to said second terminal.

2. An electronic method for electronically sending and receiving digital signatures concerning a transaction message M between a first terminal for a first transacting party and a second terminal for a second transacting party, comprising the steps:

A. in said first terminal:
(1) generating a Hash total $h'(M)$ of the transaction message M derived by compression-encoding said transaction message M and a Hash total $h(M)$ different from said Hash total $h'(M)$;
(2) preparing a digital signature $T(A)$ by encoding data including at least first data containing the Hash total $h'(M)$ and a first certificate not containing the transaction message M by using a secret key of the first transacting party, based on a public key cryptograph system;
(3) sending the prepared digital signature $T(A)$ obtained in said step A(2) from said first terminal to said second terminal;

B. in said second terminal:
(1) preparing a digital signature $S(B)$ by encoding data including at least second data containing the Hash total $h(M)$ different from the Hash total $h'(M)$ and a second certificate not containing the transaction message M by using a secret key of the second transacting party, based on the public key cryptograph scheme;

(2) sending the digital signature S(B) obtained in said step B(1) from said second terminal to said first terminal; and C. in said first terminal:

after receiving of the digital signature S(B) from said second terminal, encoding data including at least third data containing the Hash total h(M) and a first certificate not containing the transaction message M by using the secret key of the first transacting party, based on the public key cryptograph scheme to obtain a digital signature S(A), and sending the digital signature S(A) from said first terminal to said second terminal.

3. An electronic transaction method according to claim 2, wherein each of the first and second certificates includes data representing acceptance of a transaction message derived by modifying information representing transaction status and data representing a grace period for permitting an opposition to the transaction.

4. An electronic transaction system according to claim 3, wherein said grace period is determined by a time required to prepare and check the certificate of the transacting party, and invalidation of the certificate issued by the transacting party is assured by an authentication organization by declaring the termination of the transaction to the authentication organization within the grace period when one of the first and second transacting parties has an opposition to the certificate of the other transacting party.

* * * * *